United States Patent
Gal et al.

(10) Patent No.: US 12,149,301 B2
(45) Date of Patent: Nov. 19, 2024

(54) SYSTEM, DEVICE AND METHODS FOR DETECTION OF UNSANCTIONED HARDWARE MODIFICATION OF A PRODUCT'S AC CIRCUIT

(71) Applicant: SODYBO LTD., Lehavim (IL)

(72) Inventors: Shmuel Gal, Kibbutz Bet Kama (IL); Alexey Tsirlin, Beer Sheva (IL); Ronit Shtendel, Lehavim (IL); Yuval Shtendel, Lehavim (IL)

(73) Assignee: SODYBO LTD., Lehavim (IL)

( * ) Notice: Subject to any disclaimer, the term of this patent is extended or adjusted under 35 U.S.C. 154(b) by 275 days.

(21) Appl. No.: 17/639,543

(22) PCT Filed: Sep. 2, 2020

(86) PCT No.: PCT/IL2020/050951
§ 371 (c)(1),
(2) Date: Mar. 1, 2022

(87) PCT Pub. No.: WO2021/044412
PCT Pub. Date: Mar. 11, 2021

(65) Prior Publication Data
US 2022/0327212 A1    Oct. 13, 2022

(30) Foreign Application Priority Data
Sep. 8, 2019  (IL) .......................................... 269191

(51) Int. Cl.
G01R 27/08   (2006.01)
G01R 27/16   (2006.01)
H04B 3/56    (2006.01)

(52) U.S. Cl.
CPC ............... *H04B 3/56* (2013.01); *G01R 27/16* (2013.01); *G06F 2221/034* (2013.01)

(58) Field of Classification Search
CPC ...... G01R 27/02; G01R 27/16; G01R 35/007; G06F 2221/034; G06F 21/57; H04B 3/56
See application file for complete search history.

(56) References Cited

U.S. PATENT DOCUMENTS

| 9,818,004 B1* | 11/2017 | Rezayee .............. G06K 7/0095 |
| 9,876,645 B1 | 1/2018 | Ramalingam |
| 2009/0292848 A1 | 11/2009 | Robinson et al. |
| 2013/0221989 A1* | 8/2013 | Schimbaeck .......... G01S 13/04 324/642 |

(Continued)

FOREIGN PATENT DOCUMENTS

| CN | 103513211 | 3/2016 |
| CN | 106094708 A | 11/2016 |
| JP | 2009055293 A | 3/2009 |

OTHER PUBLICATIONS

International search report for PCT/IL2020/050951 dated Dec. 28, 2020.

(Continued)

*Primary Examiner* — Thang X Le
(74) *Attorney, Agent, or Firm* — The Roy Gross Law Firm, LLC; Roy Gross

(57) ABSTRACT

Provided herein are systems, devices and methods for detection of unsanctioned implantation of a powerline communication module in a product under test, without the need to disassemble the product under test.

19 Claims, 7 Drawing Sheets

(56) References Cited

U.S. PATENT DOCUMENTS

| | | | |
|---|---|---|---|
| 2013/0222144 A1* | 8/2013 | Hadar | G08B 21/182 |
| | | | 324/612 |
| 2013/0315286 A1* | 11/2013 | Shad | H04B 3/54 |
| | | | 375/257 |
| 2013/0335207 A1 | 12/2013 | Magin et al. | |
| 2014/0333466 A1* | 11/2014 | Mohamadi | G01S 13/887 |
| | | | 342/27 |
| 2016/0358722 A1 | 12/2016 | Lakshmanan et al. | |
| 2018/0011130 A1 | 1/2018 | Gonzalez et al. | |
| 2018/0013779 A1 | 1/2018 | Gonzalez et al. | |
| 2019/0028284 A1* | 1/2019 | Rezayee | H04L 9/14 |
| 2019/0162765 A1 | 5/2019 | Steuer | |
| 2019/0207953 A1* | 7/2019 | Klawe | G06F 21/57 |

OTHER PUBLICATIONS

Written opinion for PCT/IL2020/050951 dated Dec. 28, 2020.
Gonzalez et al. Detecting Unauthorized Software Execution in SDR Using Power Fingerprinting, The 2010 Military Communications Conference Oct. 31, 2010 pp. 2211-2216. doi: 10.1109/MILCOM.2010.5680393.
Search Report for Singapore 11202202116Q Completed Oct. 2, 2024 2 pages.

\* cited by examiner

SYSTEM, DEVICE AND METHODS FOR DETECTION OF UNSANCTIONED HARDWARE MODIFICATION OF A PRODUCT'S AC CIRCUIT

This application is a National Phase of PCT Patent Application No. PCT/IL2020/050951 having International filing date of Sep. 2, 2020, which claims the benefit of priority of Israeli Patent Application No 269191, filed Sep. 8, 2019, the contents of which are all incorporated herein by reference in their entirety.

FIELD OF THE INVENTION

The invention relates to the field of unsanctioned hardware modification. More specifically, the systems, devices and methods disclosed are used for the detection of unsanctioned hardware modification of a product's AC circuit.

BACKGROUND

The increasing complexity of the hardware design of today's products makes it very difficult to detect unsanctioned hardware modification in such products. In some cases, the unsanctioned hardware modification can be an implantation of a powerline communication module that serves as a trojan horse. Such trojan horses can be used for eavesdropping, cyber-attacks, and the like. As a result, it becomes essential to many companies and organizations to verify that the products used are free of such hardware modifications, in some cases even before they start using these products.

Several methods are currently employed to detect an unsanctioned implantation of a powerline communication module in a product under test.

One method is to perform a visual inspection of the product under test, which checks for hardware visible modifications (compared to a corresponding trusted unmodified product), one of the disadvantages of this method is the fact that such inspection can take a very long time and may also require disassembly of each product under test.

Another method is monitoring the power consumption of the product under test and compare it to the power consumption of a corresponding trusted unmodified product, under the same scenario. One of the disadvantages of this method is its limited capability to determine if the difference in the power consumption is due to natural based power consumption variance or due to the presence of a powerline communication module.

Another method is to sense and detect the presence of powerline communication signals coming from the product under test. One of the disadvantages of this method is that it depends on the occurrence of transmissions initiated by the powerline communication module within the product under test (if there are no transmissions, the sensor will not detect the powerline communication module).

There is thus a need in the art for reliable and efficient systems, devices and methods that can be used to detect an unsanctioned implantation of a powerline communication module in a product under test (in some cases even before the product is approved for usage), without the need to disassemble the product under test.

SUMMARY OF THE INVENTION

The present invention, in embodiments thereof, provides systems, devices and methods that allow a very reliable and efficient detection of unsanctioned implantation of a powerline communication module in a product under test, without the need to disassemble the product under test.

Such products can be, for example, computer related products (such as, a PC, a display screen, a router, a printer, and the like), home appliances (such as, a coffee machine, a microwave, a toaster oven, and the like), lab equipment (such as, a spectrum analyzer, an oscilloscope, a signal generator, and the like), or any other product that can be connected to the mains.

In some embodiments, there is provided a device for detection of unsanctioned implantation of a powerline communication module in a connected product, the device may include: a controller; a signal generator configured to generate a signal and a current sensor configured to measure the electric current evolved from the generated signal; an AC-out connector configured to connect the device to the product; an AC-in connector configured to connect the device to the mains; and an analog front-end unit (AFE) configured to couple the signal generator and the current sensor to the AC-out connector.

In some embodiments, the device may further include an on/off switch, configured to control on-off state of the connected product.

In some embodiments, the device may further include a power line filter, configured to create a low noise and/or high impedance environment at an AC-out side of the device.

In some embodiments, the device may further include: a local database, a processing unit, a user interface (a command and/or control unit), a power supply, or any combination thereof.

In some embodiments, the device may further include a network connection.

In some embodiments, the signal generator may be configured to generate an output signal in the frequency range of about 10 KHz-30 MHz.

In some embodiments, signal generator's output signal may be a chirp.

In some embodiments, the current sensor may be configured to measure current at a frequency range of an input signal at about 10 KHz-30 MHz.

In some embodiments, the coupling frequency of the input/output signal coupled by the AFE may be in the range of about 10 KHz-30 MHz.

In some embodiments, the power line filter may be configured to operate at the frequency range of about 10 KHz-30 MHz.

In some embodiments, the measured current evolved from the generated signal may be used to determine the impedance fingerprint of the product.

In some embodiments, the fingerprint of the product may be obtained at an off-state of the product and/or at an on-state of the product.

In some embodiments, the device may be configured to execute a method for detection of unsanctioned implantation of a powerline communication module in the connected product, the method may include comparing the impedance fingerprint of the connected product to a corresponding reference impedance fingerprint obtained from a corresponding trusted unmodified product.

In some embodiments, there is provided a method for detection of unsanctioned implantation of a powerline communication module in a product, the method may include one or more of the steps of:

obtaining an impedance fingerprint of an AC circuit of the product; and comparing the impedance fingerprint of the product to an AC impedance circuit fingerprint of a trusted unmodified corresponding product (golden fingerprint);

wherein a difference in values of the compared fingerprints is indicative of an unsanctioned implantation of a powerline communication module in the product.

In some embodiments, obtaining the impedance fingerprint may include applying a signal on the product's AC circuit and measuring the evolved electric current and to create the impedance fingerprint.

In some embodiments, the signal may be a chirp.

In some embodiments, the frequency range of the chirp may be in the range of about 10 KHz-30 MHz.

In some embodiments, the fingerprints may be obtained at an off-state and/or an on-state of the product.

In some embodiments, the golden fingerprint and/or the product fingerprint may be created by, for example, applying a signal on the AC circuit of the trusted unmodified product and measuring the evolved electric current to create the golden fingerprint.

In some embodiments, the fingerprints may be created on a server.

In some embodiments, the fingerprints may be created in the device.

In some embodiments, the golden fingerprint may be obtained from a database.

In some embodiments, the method may further include storing the products fingerprint and/or the golden fingerprint on a database.

In some embodiments, the database may a local database of a detection device configured to be connected to the product and apply the signal on the product's AC circuit and measure the evolved electric current.

In some embodiments, the database may be a network database connected to a server.

In some embodiments, the creation of the fingerprint(s) may be done on a server.

In some embodiments, the creation of the fingerprint(s) may be performed by the device.

In some embodiments, comparing between the fingerprints may include loading the golden fingerprints, loading the impedance fingerprints of the product under test and comparing between the golden fingerprint and the impedance fingerprint of the product under test.

In some embodiments, comparing between the fingerprints may further include saving and/or displaying the test results.

In some embodiments, the golden fingerprints may be loaded from the network database connected to the server.

In some embodiments, the golden fingerprints may be loaded from the local database within the detection device.

In some embodiments, the comparison process may be performed by the server or by the detection device.

In some embodiments, the test results may be saved on the local database and/or the network database.

In some embodiments, the test results may be displayed on the detection device and/or the server.

In some embodiments, there is provided a system for detection of unsanctioned implantation of a powerline communication module in a product under test, the system may include a server and a database and a detection device, said detection device may include:

a controller;

a signal generator configured to generate a signal and a current sensor configured to measure the electric current evolved from the generated signal;

an AC-out connector configured to connect the device to the product;

an AC-in connector configured to connect the device to the mains; and an analog front-end unit (AFE) configured to couple the signal generator and the current sensor to the AC-out connector.

In some embodiments, the system's detection device may be configured to execute a method for detection of unsanctioned implantation of a powerline communication module in a product under test, the method may include comparing the impedance fingerprint of the product to an AC impedance circuit fingerprint of a trusted unmodified corresponding product (golden fingerprint);

wherein a difference in values of the compared fingerprints may be indicative of an unsanctioned implantation of a powerline communication module in the product.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWING

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
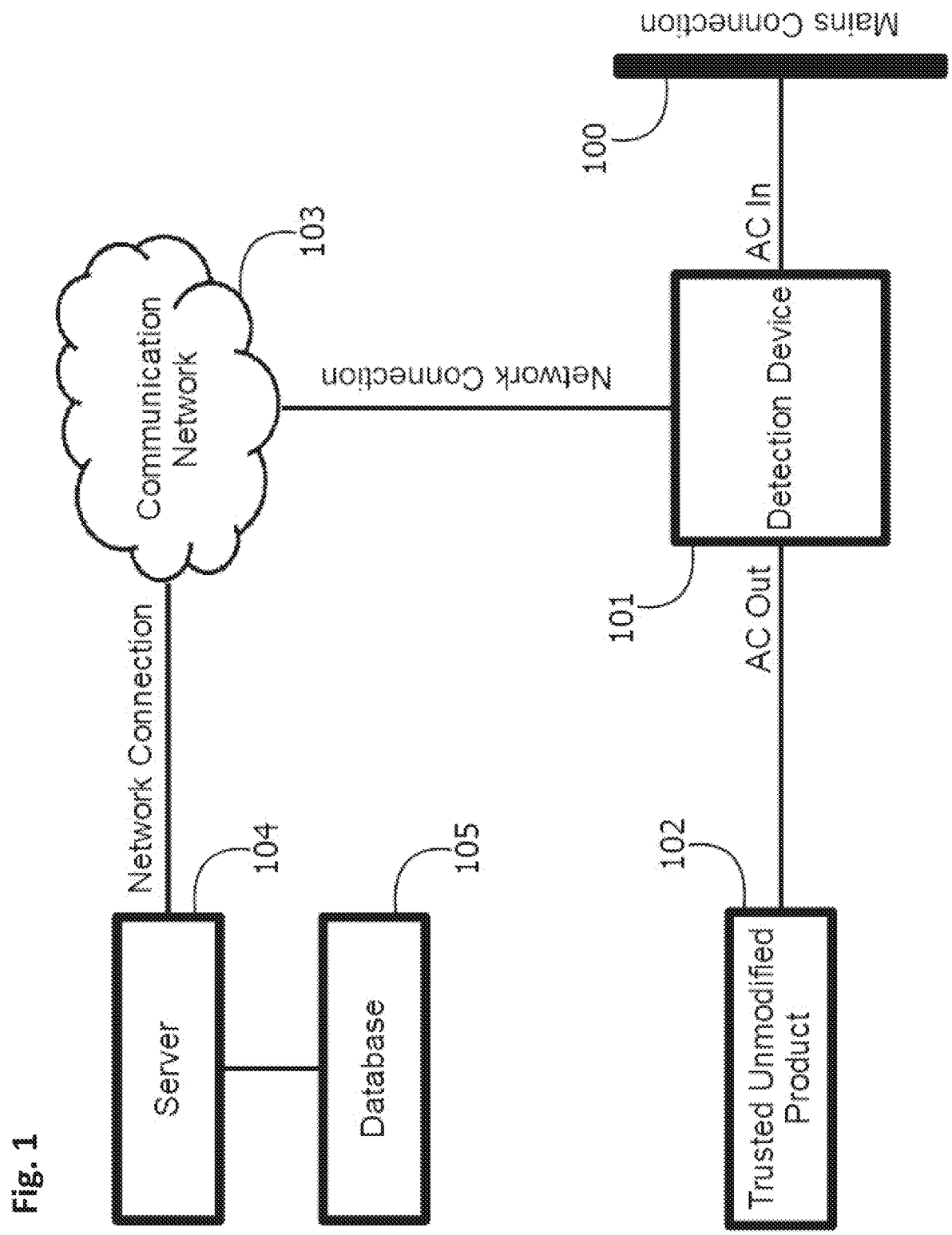
FIG. 1. A general scheme of a system for obtaining a golden fingerprint of a trusted unmodified product, according to some embodiments.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the following description, various aspects of the invention will be described. For the purpose of explanation, specific details are set forth in order to provide a thorough understanding of the invention. However, it will also be apparent to one skilled in the art that the invention may be practiced without specific details being presented herein. Furthermore, well-known features may be omitted or simplified in order not to obscure the invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description.

According to some embodiments, there are provided systems, devices and methods that allow a very reliable and efficient detection of unsanctioned implantation of a powerline communication module in a product under test, without the need to disassemble the product under test.

To facilitate understanding, the following terms are defined:

As used herein, the term "impedance fingerprint" refers to a product's AC circuit impedance amplitude and phase values vs. frequency.

As used herein the term "golden fingerprint" refers to an impedance fingerprint of a trusted unmodified product.

As used herein the term "corresponding product" refers to an identical product, especially regarding the product's AC circuit.

According to some embodiments, a product can be any product which is capable of connecting to mains power (directly or indirectly). According to some exemplary embodiments, a product may be selected from, but not limited to: computer related products (such as, a PC, a display screen, a router, a printer, and the like); home appliances (such as, a coffee machine, a microwave, a toaster oven, and the like); lab equipment (such as, a spectrum analyzer, an oscilloscope, a signal generator, and the like); and the like. Each possibility is a separate embodiment.

According to some embodiments, without wishing to bound to any theory or mechanism, a powerline communication module is connected to the power lines, as a result, an implantation (authorized or non-authorized) of the powerline communication module inside a product changes the impedance fingerprint of the product. Accordingly, as disclosed herein, the detection of implantation of a powerline communication module may be achieved by comparing the impedance fingerprint of a product under test to a golden fingerprint of a corresponding product.

Reference is made to FIG. 1, which illustrates a general scheme of a system for obtaining a golden fingerprint of a trusted unmodified product, according to some embodiments. As shown in FIG. 1, a trusted unmodified product (102) is connected to (and powered by) a detection device (101). The detection device (101) is connected to the mains (100) and may also be optionally connected to a server (104) via a communication network (103). The server may be further connected to a database (105). The detection device may include, inter alia, as further detailed below, an A/C out connection configured to connect to a product (tested product, standard product, modified product, non-modified product, etc.), and an A/C-in connection, configured to connect the device to the mains power.

Figure 2:
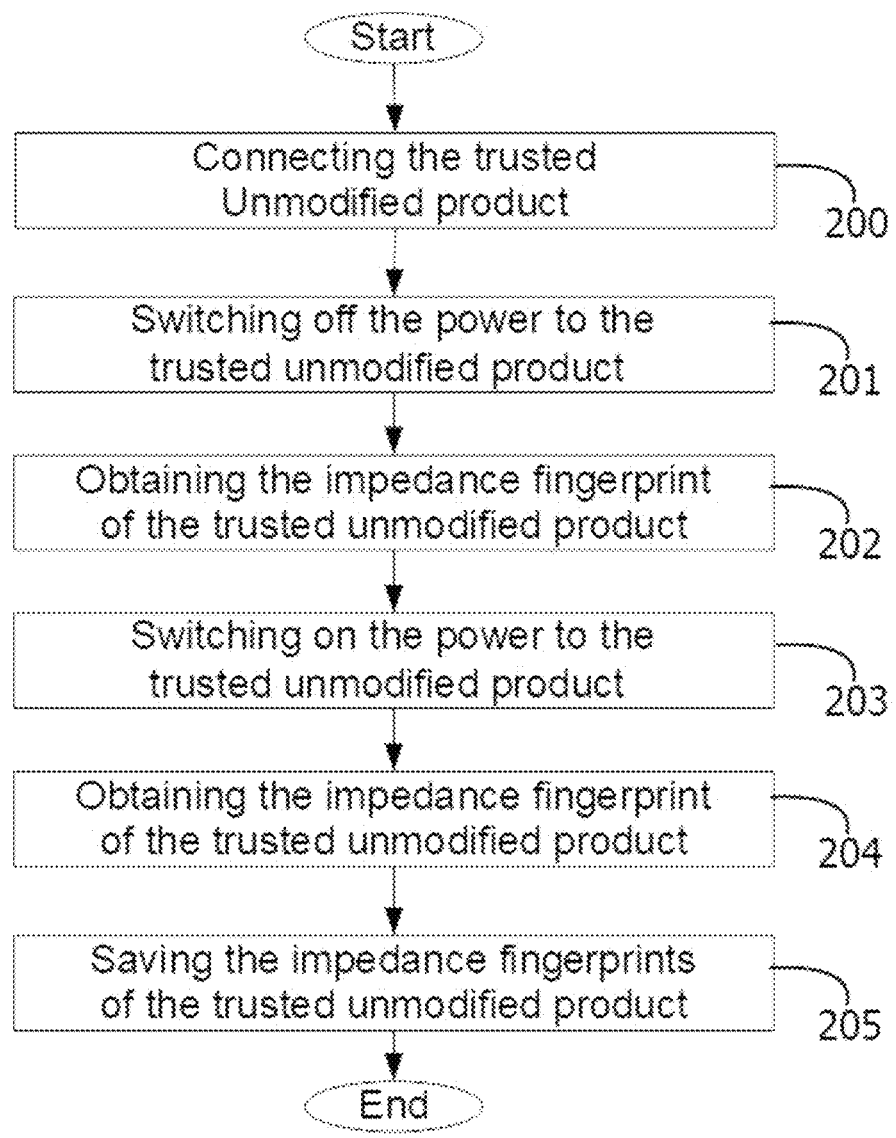
FIG. 2. A flow chart of steps in a method for obtaining an impedance fingerprint of a trusted unmodified product, according to some embodiments.

Reference is now made to FIG. 2, which illustrates a flow chart of steps in a method for obtaining an impedance fingerprint of a trusted unmodified product, according to some embodiments. In step 200, the trusted unmodified product is connected to the detection device. Next, on step 201, the detection device is configured to switch off the power to the trusted unmodified product. Next, on step 202, the impedance fingerprint of the trusted unmodified product (at power off state) is obtained, for example, by applying a chirp signal on the product's AC circuit and measuring the evolved electric current. The measurements of the electric current can be used by the detection device, (or by a connected server, if applicable), to create an impedance fingerprint of the trusted unmodified product (at power off state). Next, on step 203, the detection device is configured to switch on the power to the trusted unmodified product. Next, on step 204, the impedance fingerprint of the trusted unmodified product (at power on state) is obtained, for example, by applying a chirp signal on the product's AC circuit and measuring the evolved electric current. The measurements of the electric current can be used by the detection device (or by the server) to create an impedance fingerprint of the trusted unmodified product (at power-on state). At the last step (205), the impedance fingerprints of the trusted unmodified product can be stored/saved in a local database (within the detection device) and/or on a network database (for example, connected to the server).

Figure 3:
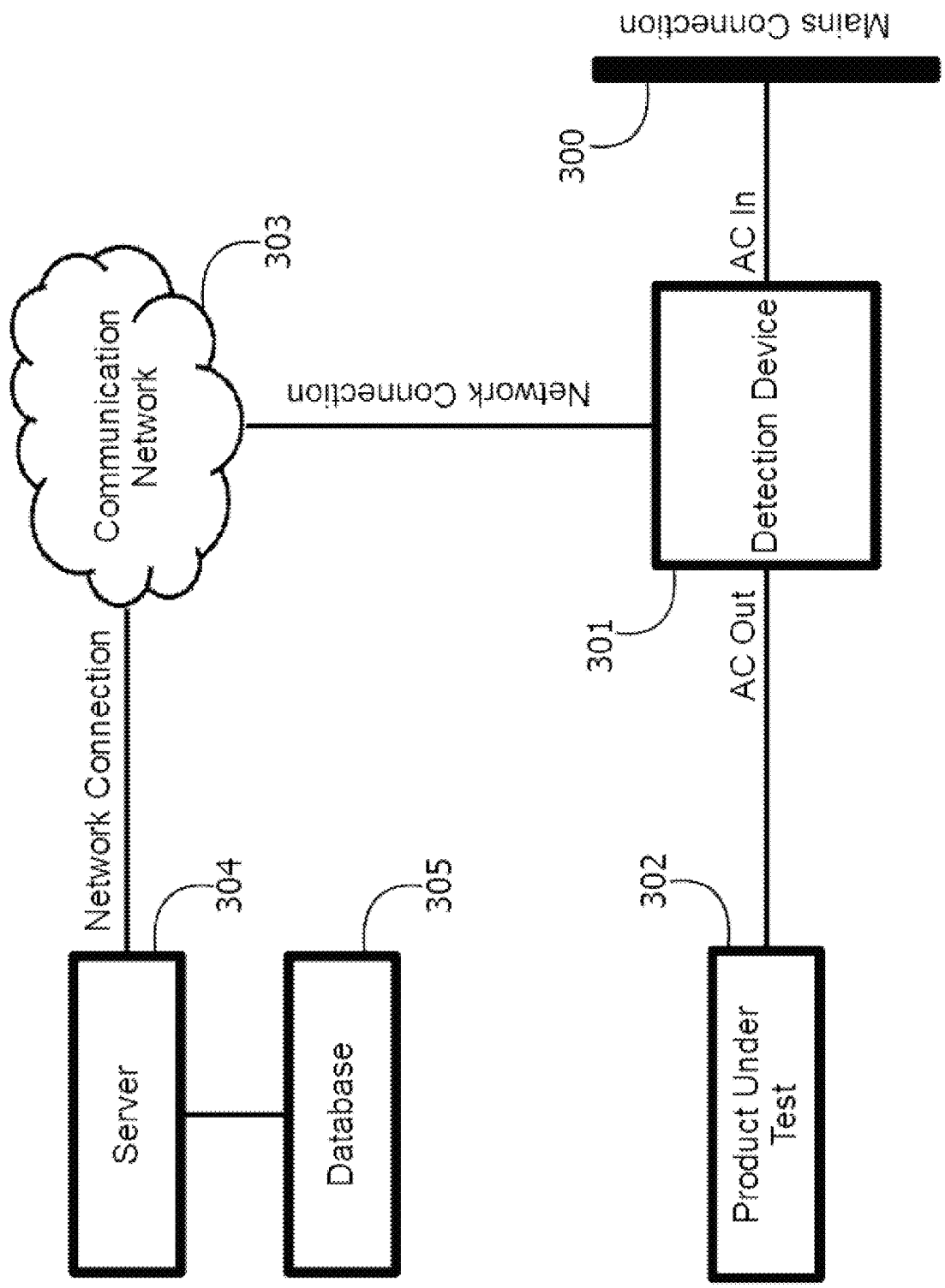
FIG. 3. A general scheme of a system for detection of unsanctioned implantation of a powerline communication module in a product under test, according to some embodiments.

Reference is now made to FIG. 3, which illustrates a general scheme of a system for detection of unsanctioned implantation of a powerline communication module in a product under test, according to some embodiments. As shown in FIG. 3, a product under test (302) is connected to (and configured to be powered by) a detection device (301). As detailed herein, the product may include any type of product that can connect to the mains. The product under test may be connected to the detection device via an A/C-out connection of the detection device. As detailed herein, the detection device (301) is connected to the mains (300) (via an A/C-in connection), and may also be optionally connected to a server (304) via a communication network (303). The server may further be optionally connected to a database (305).

Figure 4:
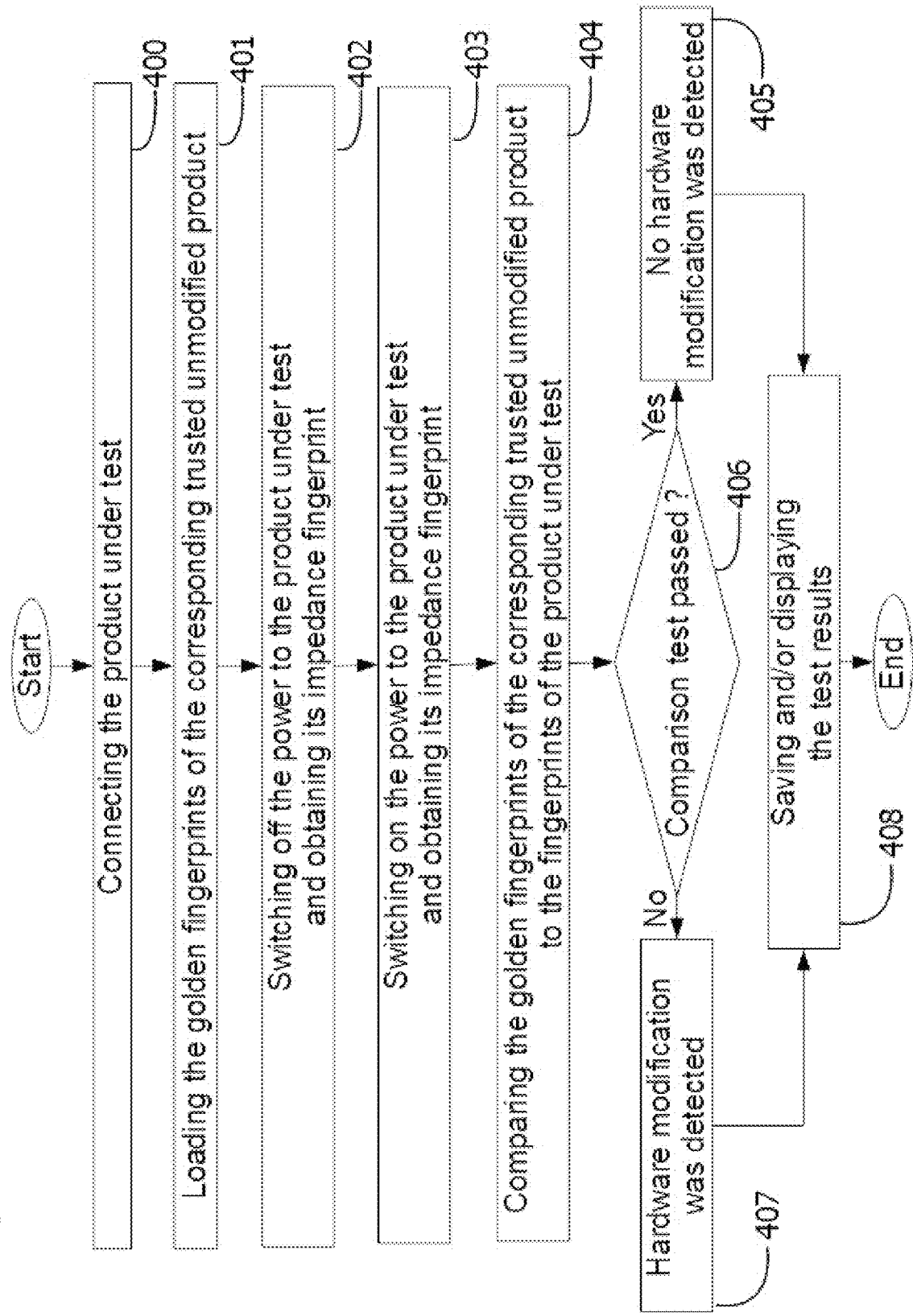
FIG. 4. A flow chart of steps in a method for detecting an unsanctioned implantation of a powerline communication module in a product under test, according to some embodiments.

Reference is now made to FIG. 4, which illustrates a flow chart of steps in a method for detecting an unsanctioned implantation of a powerline communication module in a product under test, according to some embodiments. In the first step (400) the product under test is connected to the detection device. At the next step (401), the golden fingerprint(s) of the corresponding product are loaded. The golden fingerprints can be loaded by/from the server or by/from the detection device, either from the local database (connected to the detection device) or from the network database (connected to the server)). Next, on step 402, the detection device is configured to switch off (turn-off) the power to the product under test and obtaining the fingerprint of the product under test (at power off state), by, for example, applying a chirp signal on the product's AC circuit, and measuring the evolved electric current. The measurements of the electric current can be used by the detection device or by the server, to create/form an impedance fingerprint of the product under test (at power off state). Next, on step 403, the detection device is configured to switch on the power to the product under test and obtain the fingerprint of the product under test (at power on state), by, for example, applying a chirp signal on the product's AC circuit, and measuring the evolved electric current. The measurements of the electric current can be used by the detection device or by the server, to create the impedance fingerprint of the product under test (at power on state). At the next step (404), the impedance fingerprint(s) of the product under test are compared to the corresponding golden fingerprints. The comparison process can be done by the detection device or by the server. The comparison process can be, for example, in the time domain and/or frequency domain of the impedance. If the comparison test (406) passed successfully (i.e., the impedance fingerprint of the product under test is similar to the corresponding golden fingerprint), it means that no hardware modification in the product under test was detected (405). If the comparison test (406) failed (i.e., the impedance fingerprint of the product under test is different from the corresponding golden fingerprint), it means that hardware modification in the product under test was detected (407). At the last step (408), the test results are saved and/or displayed by the detection device and/or the server at the local database (connected to the detection device) and/or the network database (connected to the server).

In some embodiments, the determination of "similar" or "different" between impedance fingerprints may be based on a predetermined threshold. For example, "similar" may include similarity or identity in the range of about 90-100%. For example, similar results may be 100% identity between the impedance fingerprint of the product under test and corresponding golden fingerprint. For example, similar results may be 95-100% identity between the impedance fingerprint of the product under test and corresponding golden fingerprint. For example, similar results may be over 90% identity between the impedance fingerprint of the product under test and corresponding golden fingerprint. For example, "different" may include similarity of identity in the range of less than about 90%-100%. For example, different result may be less than 100% identity between the impedance fingerprint of the product under test and corresponding golden fingerprint. For example, different results may be less than about 99% identity between the impedance fingerprint of the product under test and corresponding golden fingerprint. For example, different results may be less than about 95% identity between the impedance fingerprint of the product under test and corresponding golden fingerprint. For example, different results may be less than about 90% identity between the impedance fingerprint of the product under test and corresponding golden fingerprint.

Figure 5:
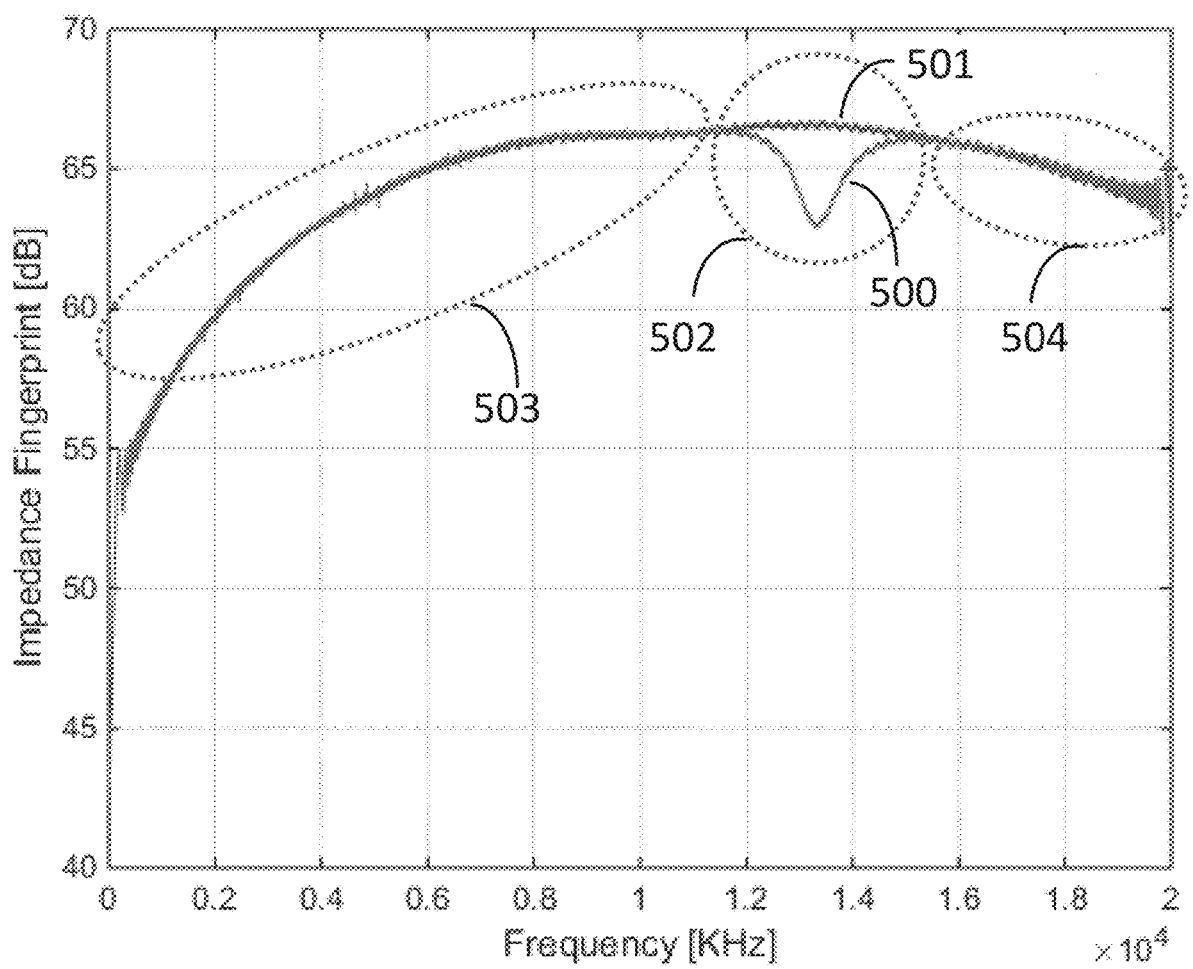
FIG. 5. Graphs of exemplary impedance fingerprints (in frequency domain), according to some embodiments.

Reference is made to FIG. 5, which shows an example of impedance fingerprint graphs (in frequency domain), according to some embodiments. As shown in FIG. 5, Graph 500 is an impedance fingerprint of a product under test which has an unsanctioned powerline communication module implanted within. Graph 501 is the corresponding golden fingerprint of an unsanctioned product. In sections marked as 503 and 504, the two graphs are similar, but the difference between the graphs at section 502 is indicative that the product under test includes an unsanctioned powerline communication module implant.

Figure 6:
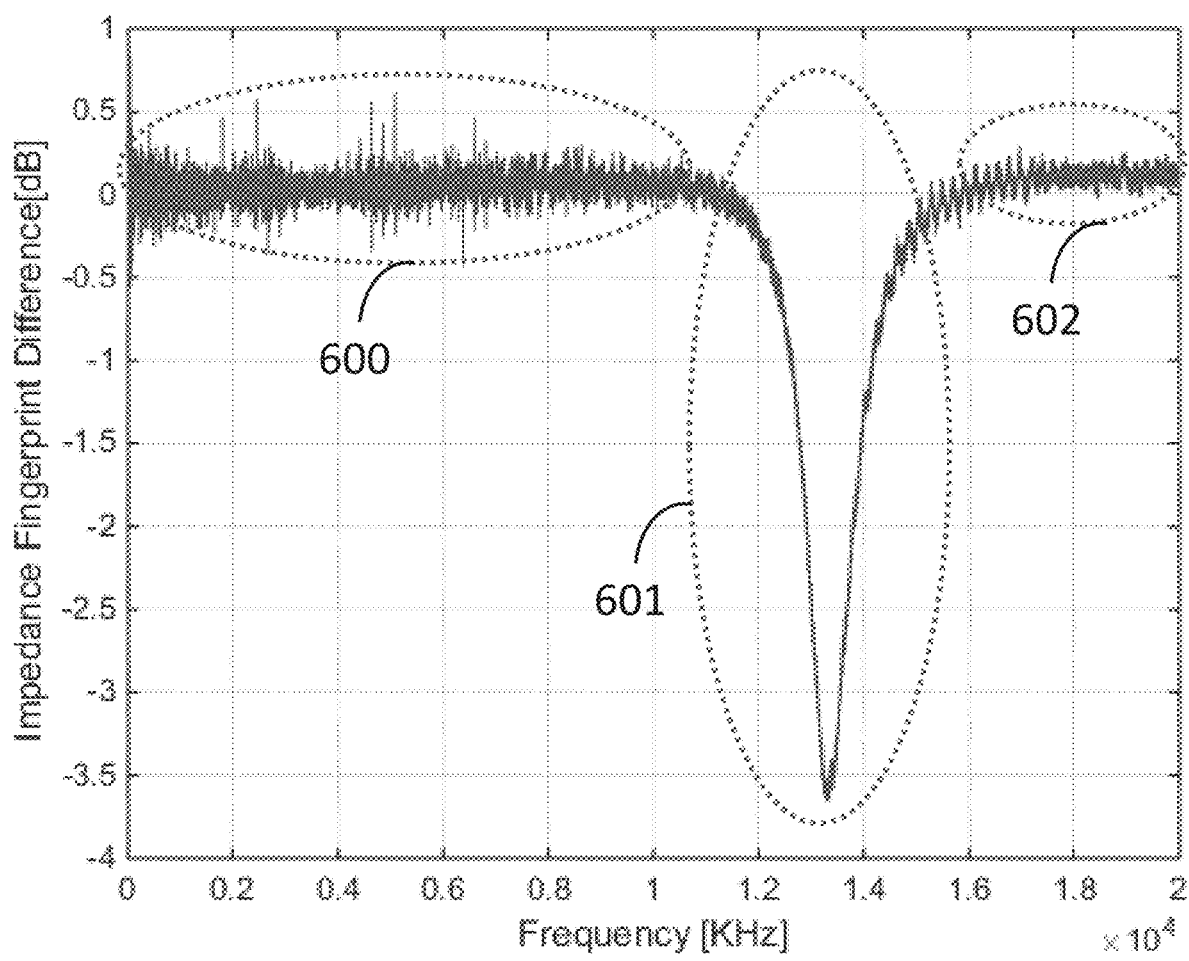
FIG. 6. Graphs showing difference (in frequency domain) between impedance fingerprint of the product under test and the corresponding golden fingerprint, according to some embodiments.

Reference is made to FIG. 6, which shows a difference graph (in frequency domain) between impedance fingerprint of a product under test and the corresponding golden fingerprint, according to some embodiments. As shown in FIG. 6, at sections 600 and 602 of the graph, the difference between the graphs is less than 0.6 dB (mostly under 0.2 dB), while the difference between the graphs at section 601 is much higher (with a pick of more than 3.5 dB). Such difference is indicative that the product under test includes an unsanctioned powerline communication module implant.

Figure 7:
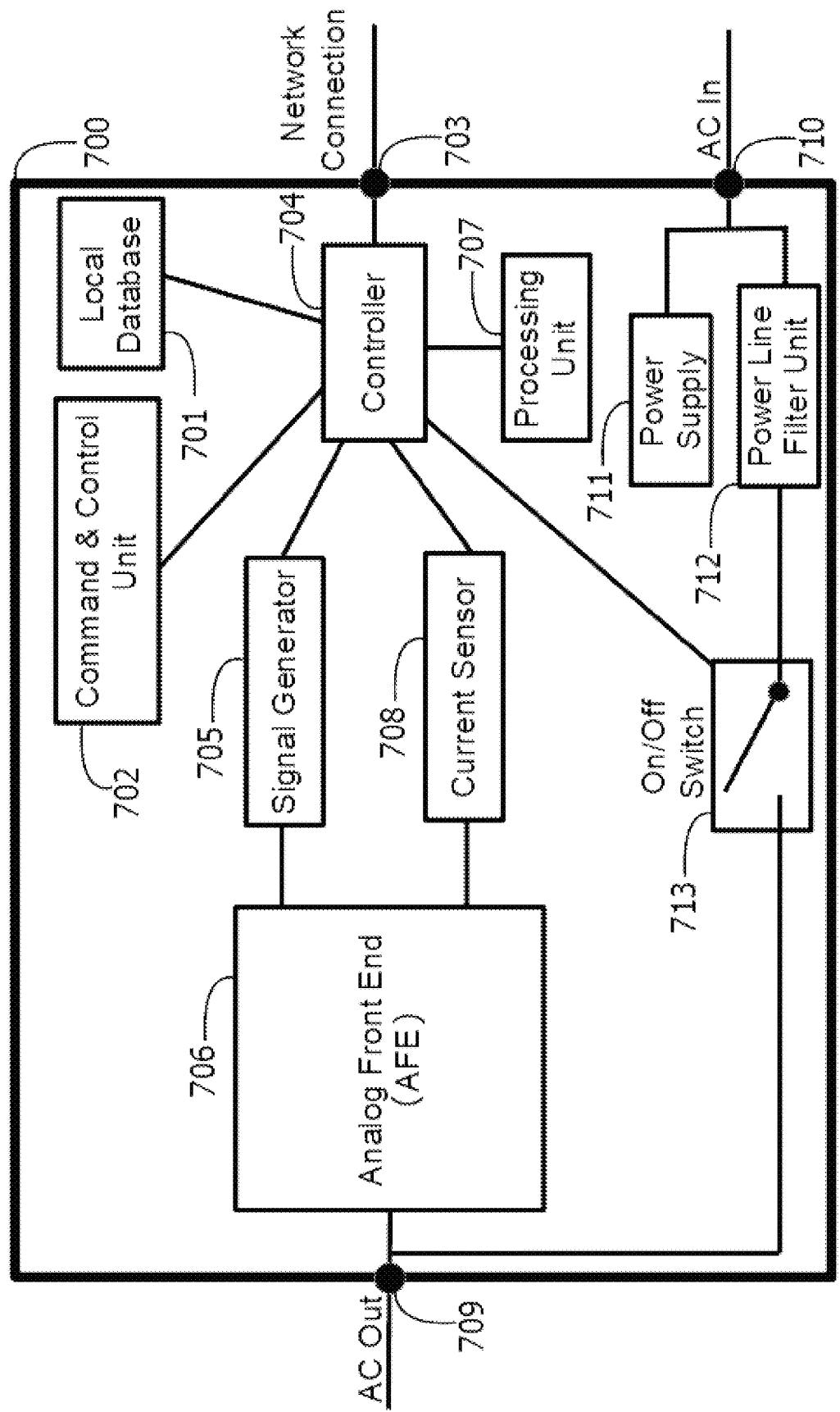
FIG. 7. A block diagram of a device for detection of unsanctioned implantation of a powerline communication module in a product under test, according to some embodiments.

Reference is now made to FIG. 7, which illustrates a block diagram of a device for detection of unsanctioned implantation of a powerline communication module in a product under test, according to some embodiments. As shown in FIG. 7, the device (700) may include one or more of the following component/units/elements: a controller (704), a local database (701), a processing unit (707), a signal generator (705), a current sensor (708), a command and control unit (GUI interface) (702), an AC-in connector (710), an AC-out connector (709), an analog front-end (AFE) block/element/unit (706) a power supply (711). In some embodiments (as shown in FIG. 7), the device may further include: a power line filter (712), an on/off switch (713) and a network connection (703).

According to some embodiments, the command and control unit (702) provides the Graphic User Interface (GUI) that can enable a user to initiate commands (for example, by using a keyboard, push buttons, and the like) and receive status and test results (for example, by using a display screen, LEDs, and the like). In some embodiments, some (or all) of the command and control unit functions can be initiated remotely (for example, via the network connection (703)).

In some embodiments, the signal generator (705) and the current sensor (708) are used to obtain the impedance fingerprint of the product. According to some embodiments, the signal generator is configured to generate a suitable signal. For example, a chirp signal (for example in the range of about 10 KHz-30 MHz) may be applied by the signal generator (705) while the current sensor (708) is configured to measure/determine/detect the evolved electric current.

In some embodiments, the measurements of the electric current are processed in a processing unit (707) to create the impedance fingerprint of the product. Alternatively, according to some embodiments, the electric current measurements (either the original values or after partial processing by the processing unit (707)) can be transferred to the server (via the network connection (703)), and the server can than create the impedance fingerprint of the product. In some embodiments, the processing unit is external to the device.

In some embodiments, the analog front-end block (AFE) (706) is configured to couple the signal generator and the current sensor to the AC-out connection (709). The AC-out is used to connect the device to the product. According to some embodiments, the coupling can be, for example at the frequency range of 10 KHz-30 MHz.

In some embodiments, a power line filter (712) may also be configured to create a low noise and high impedance environment at the AC-out side (709), for example, at the frequency range of 10 KHz-30 MHz. Such filtered environment can eliminate potential bias in the measurements of the product's fingerprints, due to changes in the noise and/or impedance conditions at the AC in-side (710) of the device.

In some embodiments, an on/off switch (713) may be used to control the power on and power off states of the product under test, hence enabling to obtain the impedance fingerprint of the product in power on and/or power off states.

In some embodiments, a controller (704) may be used to communicate and coordinate between the elements/components/units of the detection device, as well as communicate with remote elements (such as, for example, a remote server) via the network connection (703).

In some embodiments, there is provided a device for detection of unsanctioned implantation of a powerline communication module in a product under test, the device may include one or more of: a controller, a local database, a processing unit, a signal generator, a current sensor, a command and control unit, an AC in connector, an AC out connector, an analog front-end (AFE) and a power supply. In some embodiments the device may further include: a power line filter, an on/off switch; a network connection, or any combination thereof. Each possibility is a separate embodiment.

In some embodiments, the frequency range of the signal generator is about 10 KHz-30 MHz. In some embodiments, the frequency range of the current sensor is about 10 KHz-30 MHz. In some embodiments, the frequency range of the analog front-end is about 10 KHz-30 MHz. In some embodiments, the frequency range of the power line filter is about 10 KHz-30 MHz.

In some embodiments, there is provided a method for detection of unsanctioned implantation of a powerline communication module in a product under test, the method may include an integrity validation of the product's AC circuit impedance. In some embodiments, the integrity validation of the product's AC circuit impedance may include: obtaining an impedance fingerprint of a trusted unmodified corresponding product (golden fingerprint), obtaining an impedance fingerprint of the product under test and comparing between the golden fingerprint and the fingerprint of the product under test.

In some embodiments, obtaining the golden fingerprint may include: connecting the trusted unmodified product to the detection device, applying a signal on the product's AC circuit, measuring the evolved electric current and creating an impedance fingerprint.

In some embodiments, the applied signal is a chirp signal. In some embodiments, the frequency range of the chirp is about 10 KHz-30 MHz.

In some embodiments, the electric current measurements may be used to create the golden fingerprint. In some embodiments, the creation of the golden fingerprint can be done on the detection device. In some embodiments, the creation of the golden fingerprint can be done on the server.

In some embodiments, the method of obtaining the golden fingerprint may be performed while the trusted unmodified product is disconnected from power (power off state).

In some embodiments, the method of obtaining the golden fingerprint may be performed while the trusted unmodified product is connected to power (power on state).

In some embodiments, the method of obtaining the golden fingerprint may further include saving the golden fingerprints in a database.

In embodiments, the database may be a local database (within the detection device) and/or a network database (connected to the server).

In some embodiments, obtaining the impedance fingerprint of the product under test may include: connecting the product under test to the detection device, applying a signal on the product's AC circuit, measuring the evolved electric current and creating an impedance fingerprint.

In some embodiments, the frequency range of the chirp is about 10 KHz-30 MHz.

In some embodiments, the electric current measurements may be used to create the impedance fingerprint of the product under test.

In some embodiments, the creation of the impedance fingerprint of the product under test can be done on the detection device.

In some embodiments, the creation of the impedance fingerprint of the product under test can be done on the server.

In some embodiments, the method of obtaining the impedance fingerprint of the product under test may be performed while the product is disconnected from power (power off state).

In some embodiments, the method of obtaining the impedance fingerprint of the product under test may be performed while the product is connected to power (power on state).

In some embodiments, the method of obtaining the impedance fingerprint of the product under test may further include saving the impedance fingerprints of the product under test in a database.

In some embodiments, the database may be a local database (within the detection device) and/or a network database (connected to the server).

In some embodiments, comparing between the golden fingerprints and the fingerprints of the product under test may include: loading the golden fingerprints, loading the impedance fingerprints of the product under test and comparing the impedance fingerprints of the product under test to the golden fingerprints. In some embodiments, the comparison may further include saving and/or displaying the test results.

In some embodiments, the golden fingerprints (used in the comparison test) can be loaded from the network database (connected to the server).

In some embodiments, the golden fingerprints (used in the comparison test) can be loaded from the local database (within the detection device).

In some embodiments, the impedance fingerprints of the product under test (used in the comparison test) can be loaded from the network database (connected to the server).

In some embodiments, the impedance fingerprints of the product under test (used in the comparison test) can be loaded from the local database (within the detection device).

In some embodiments, the comparison process is performed by the server or by the detection device.

In some embodiments, the test results, can be saved and/or displayed on the detection device and/or the server.

In some embodiments, test results of a product with unsanctioned implantation of a powerline communication module can be compared to test results of similar products with unsanctioned implantation of a powerline communication module, a positive result of such comparison can imply that the same powerline communication module was implanted possibly by the same unsanctioned planter.

In some embodiments, there is provided a system for detection of unsanctioned implantation of a powerline communication module in a product under test, the system may include: a server, a database and a detection device capable of performing a method for detection of unsanctioned implantation of a powerline communication module in a product under test, said device may include: a controller, a local database, a processing unit, a signal generator, a current sensor, a command and control unit, an AC in connector, an AC out connector, an analog front-end and a power supply. In some embodiments the said device may further include: a power line filter. An on/off switch and a network connection.

In some embodiments the server is capable of executing a method for detection of unsanctioned implantation of a powerline communication module in a product under test.

In some embodiments, the device may be configured to execute a method of detecting an unsanctioned implantation of a powerline communication module in a product under test, by determining the integrity validation of the product's AC circuit impedance As used herein, the term "about" may be used to specify a value of a quantity or parameter to within a continuous range of values in the neighborhood of (and including) a given (stated) value. According to some embodiments, "about" may specify the value of a parameter to be between 80% and 120% of the given value. According to some embodiments, "about" may specify the value of a parameter to be between 90% and 110% of the given value. According to some embodiments, "about" may specify the value of a parameter to be between 95% and 105% of the given value.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise. The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

The present invention is not to be limited in scope by the specific embodiments described herein. Indeed, various modifications of the invention in addition to those described herein will become apparent to those skilled in the art from foregoing description and the accompanying figures. Such modifications are intended to fall within the scope of the appended claims.

What we claim is:

1. A device for detection of unsanctioned implantation of a powerline communication module in a connected product, the device comprising:
   a controller;
   a signal generator and a current sensor, the signal generator is configured to generate a signal and the current sensor is configured to measure the electric current evolved from the generated signal;
   an AC-out connector configured to connect the device to the connected product;
   an AC-in connector configured to connect the device to a mains power supply; and
   an analog front-end unit (AFE) configured to couple the signal generator and the current sensor to the AC-out connector.

2. The device of claim 1, further comprising an on/off switch, configured to control on-off state of the connected product.

3. The device of claim 1, further comprising a power line filter, configured to create a low noise and/or high impedance environment at an AC-out side of the device, said power line filter is configured to operate at a frequency range of about 10 KHz-30 MHz.

4. The device according to claim 1, further comprising: a local database, a processing unit, a user interface, a power supply, a network connection, or any combination thereof.

5. The device according to claim 1, wherein the signal generator is configured to generate an output signal in a frequency range of about 10 KHz-30 MHz and/or wherein the output signal is a chirp signal.

6. The device according to claim 1, wherein the current sensor is configured to measure current at a frequency range of an input signal at about 10 KHz-30 MHz.

7. The device according to claim 1, wherein the input/output signal is coupled by the AFE at a frequency range of about 10 KHz-30 MHz.

8. The device of claim 1, wherein the measured current evolved from the generated signal is used to determine an impedance fingerprint of the connected product, wherein
   the impedance fingerprint of the product is obtained at an off-state of the product and/or at an on-state of the product.

9. The device according to claim 1, configured to execute a method for detection of unsanctioned implantation of a powerline communication module in the connected product, the method comprising comparing an impedance fingerprint of the connected product to a corresponding reference impedance fingerprint obtained from a corresponding trusted unmodified product.

10. A method for detection of unsanctioned implantation of a powerline communication module in a product, the method comprising:
    obtaining an impedance fingerprint of an AC circuit of the product; and
    comparing the impedance fingerprint of the product to an AC impedance circuit fingerprint of a trusted unmodified corresponding product (golden fingerprint);
    wherein a difference in values of the compared fingerprints is indicative of an unsanctioned implantation of a powerline communication module in the product,
    wherein obtaining the impedance fingerprint comprises applying a signal on the product's AC circuit and measuring the evolved electric current and to create the impedance fingerprint.

11. The method of claim 10, wherein a frequency range of the signal is in a range of about 10 KHz-30 MHz.

12. The method according to claim 10, wherein the impedance fingerprints are obtained at an off-state and/or an on-state of the product.

13. The method according to claim 10, wherein the golden fingerprint and/or the impedance fingerprint are created by applying a signal on the AC circuit of the trusted unmodified product and measuring the evolved electric current to create the golden fingerprint.

14. The method according to claim 13, wherein the fingerprints are created on a server and/or in a detection device, and/or wherein the golden fingerprint is obtained from a database.

15. The method according to claim 10, wherein the method further comprises storing the impedance fingerprint and/or the golden fingerprint on a database; wherein the database is a local database of a detection device configured to be connected to the product and apply the signal on the product's AC circuit and measure the evolved electric current; or wherein the database is a network database connected to a server.

16. The method of claim 10, wherein comparing between the fingerprints comprises loading the golden fingerprints, loading the impedance fingerprints of the product under test and comparing between the golden fingerprint and the impedance fingerprint of the product under test.

17. The method of claim 16, wherein the golden fingerprints and/or the impedance fingerprints are loaded from a network database connected to the server and/or from local database within a detection device.

18. The method of claim 16, wherein comparing between the fingerprints further comprises saving and/or displaying the test results; and/or
   wherein the comparison process is performed in a server or in a detection device; and
   wherein the test results are saved and/or displayed on a local database and/or the network database.

19. A system for detection of unsanctioned implantation of a powerline communication module in a product under test, the system comprising a server and a database; and a detection device, said detection device comprising:
   a controller;
   a signal generator and a current sensor, the signal generator is configured to generate a signal and a current sensor is configured to measure the electric current evolved from the generated signal;
   an AC-out connector configured to connect the device to the product;
   an AC-in connector configured to connect the device to a mains power supply; and
   an analog front-end unit (AFE) configured to couple the signal generator and the current sensor to the AC-out connector.

* * * * *